（12）United States Patent
Sakamoto

(10) Patent No.: US 8,902,327 B2
(45) Date of Patent: Dec. 2, 2014

(54) IMAGER HAVING A MOVIE CREATOR

(71) Applicant: Pentax Ricoh Imaging Company, Ltd., Tokyo (JP)

(72) Inventor: Yoshihide Sakamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 22 days.

(21) Appl. No.: 13/790,711

(22) Filed: Mar. 8, 2013

(65) Prior Publication Data

US 2013/0258137 A1 Oct. 3, 2013

(30) Foreign Application Priority Data

Mar. 28, 2012 (JP) .................. 2012-074099

(51) Int. Cl.
 *H04N 5/228* (2006.01)
 *H04N 5/262* (2006.01)
 *H04N 5/235* (2006.01)

(52) U.S. Cl.
 CPC ........... *H04N 5/2621* (2013.01); *H04N 5/2355* (2013.01); *H04N 5/2356* (2013.01)
 USPC .................... 348/222.1; 348/221.1

(58) Field of Classification Search
 CPC H04N 5/23232; H04N 5/2355; H04N 5/2356
 USPC .......... 348/222.1, 220.1, 221.1, 228.1, 229.1, 348/362
 See application file for complete search history.

(56) References Cited

U.S. PATENT DOCUMENTS

| 5,162,914 | A  | * | 11/1992 | Takahashi et al. ......... 348/229.1 |
| 8,305,453 | B2 |   | 11/2012 | Terauchi |
| 2007/0146538 | A1 | * | 6/2007 | Kakinuma et al. ............ 348/362 |
| 2010/0295961 | A1 |   | 11/2010 | Terauchi |
| 2012/0057747 | A1 |   | 3/2012 | Uehara |

FOREIGN PATENT DOCUMENTS

JP 2002-84449 3/2002

* cited by examiner

*Primary Examiner* — Nelson D. Hernández Hernández
(74) *Attorney, Agent, or Firm* — Greenblum & Bernstein, P.L.C.

(57) ABSTRACT

An imager is provided having an imaging sensor, a still image composer, and a movie creator. The imaging sensor takes still images with exposures that differ from each other. The still image composer composes still images so as to create a composite still image. The movie creator integrates the composite still images so as to create a movie. The composer creates a false composite still image and the movie creator integrates the false composite still image in order to create a movie upon the still image composer being unable to create the composite still image.

11 Claims, 8 Drawing Sheets

IMAGER HAVING A MOVIE CREATOR

BACKGROUND OF THE INVENTION

Field of the Invention

The present invention relates to an imager and method for creating a movie by integrating multiple still images.

SUMMARY OF THE INVENTION

An object of the present invention is to provide an imager and method for creating a movie that comprises high-dynamic range still images.

According to the present invention, an imager is provided that comprises an imaging sensor, a still image composer, and a movie creator. The imaging sensor takes still images with exposures that differ from each other. The still image composer composes still images so as to create a composite still image. The movie creator integrates the composite still images so as to create a movie. The composer creates a false composite still image and the movie creator integrates the false composite still image in order to create a movie upon the still image composer being unable to create the composite still image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
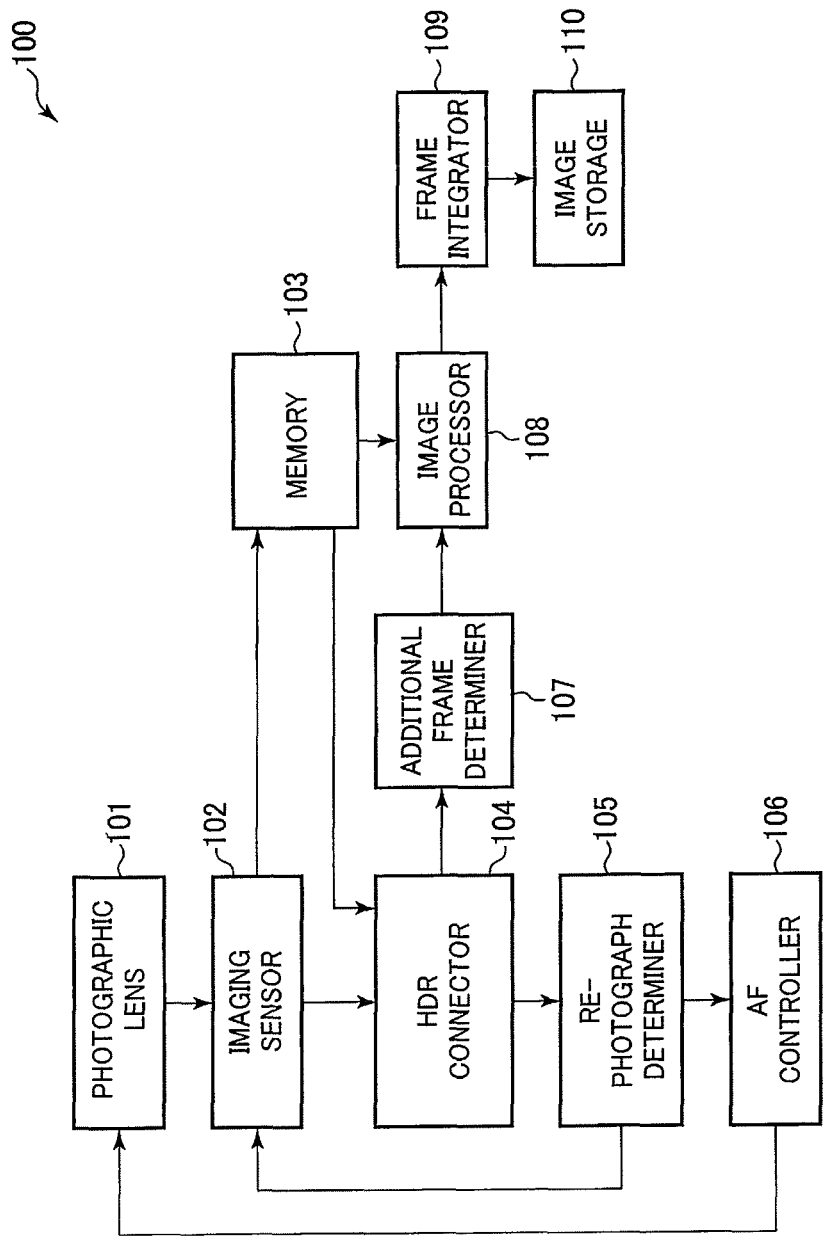
FIG. 1 is a block diagram showing the imager as an embodiment of the present invention.

The present invention is described below with reference to the embodiments shown in the drawings.

FIG. 1 shows a digital camera 100, which is the embodiment of the present invention. The constructions of the digital camera 100 are described hereinafter with reference to FIG. 1.

The digital camera 100 can integrate multiple still images so as to create a movie, and mainly comprises a photographic lens 101 as an optical element, an imaging sensor 102, a memory 103, an HDR connector 104, a re-photograph determiner 105, an AF controller 106 as a focus controller, an additional frame determiner 107, an image processor 108, a frame integrator 109 as a movie creator, and an image storage 110 having a memory card. A still image composer comprises the memory 103, the HDR connector 104, the re-photograph determiner 105, the additional frame determiner 107, the image processor 108, and the frame integrator 109.

The photographic lens 101 attached to the digital camera 100 is detachable. The imaging sensor comprises a CCD. The photographic lens 101 forms a subject image on the CCD. The CCD continuously captures the subject image and outputs multiple still images.

The HDR connector 104 receives still images from the imaging sensor 102 and creates the composite still image, that is, the HDR (High Dynamic Range) image. The HDR image has a wide dynamic range and is created by connecting multiple still images that have exposures that differ from each other. In the present embodiment, an HDR image is created by connecting three still images that have exposures that differ from each other. The HDR connector 104 is a controller that operates the digital camera 100 with multiple photographing modes. The photographing modes include a focus priority mode and a shutter release priority mode, for example. The digital camera 100 in the focus priority mode does not photograph a subject until the photographic lens 101 is focused on the subject, whether or not a shutter release button 110 is depressed, and photographs a subject after the photographic lens 101 is focused on the subject. The digital camera 100 in the shutter release priority mode photographs a subject whether or not the photographic lens 101 is focused on the subject when the shutter release button 110 is depressed.

The re-photograph determiner 105 determines whether or not the imaging sensor 102 recaptures a still image when the HDR connector 104 cannot create an HDR image. It sends a re-photograph command to the imaging sensor 102 when it determines that the imaging sensor 102 must recapture a still image again. The situation where the HDR connector 104 cannot create an HDR image corresponds to the case in which the position of a subject in a still image differs among each still image, and flicker caused by illumination is included in a still image.

The AF controller 106 is an electric circuit that focuses the photographing lens 101 on a subject. It references a still image photographed by the imaging sensor 102 and focuses the photographing lens 101 on a subject. The AF controller 106 focuses the photographing lens 101 on a subject again when the re-photograph determiner 105 determines that the imaging sensor 102 recaptures a still image again.

The additional frame determiner 107 determines whether or not an HDR image is integrated to a movie. In the determination, the additional frame determiner 107 determines that the HDR image should be integrated to a movie when the HDR connector 104 can create the HDR image, so that the frame integrator 109 integrates the HDR image to a movie in that situation. In the determination, the additional frame determiner 107 determines that the HDR image should not be integrated to a movie when the HDR connector 104 cannot create the HDR image, so that the frame integrator 109 integrates a false HDR image to the movie, or stops creating the movie, or photographs again and creates another HDR image. The false HDR image corresponds to a false composite still image.

The image processor 108 creates the false HDR image. A false HDR image is created from a still image when the HDR connector 104 cannot create an HDR image.

The frame integrator 109 adds an HDR image or a false HDR image to a movie. The image storage 110 stores a movie.

The memory 103 temporarily stores an image output by the imaging sensor 102, the HDR connector 104, and the image processor 108.

The function of the digital camera 100 is described hereinafter. The digital camera 100 photographs multiple still images with exposures that differ from each other, and integrates multiple still images so as to create an HDR image. After that, the multiple HDR images are integrated in chronological order so as to create a movie. Thereby, a user obtains a movie that comprises the multiple HDR images.

Figure 2:
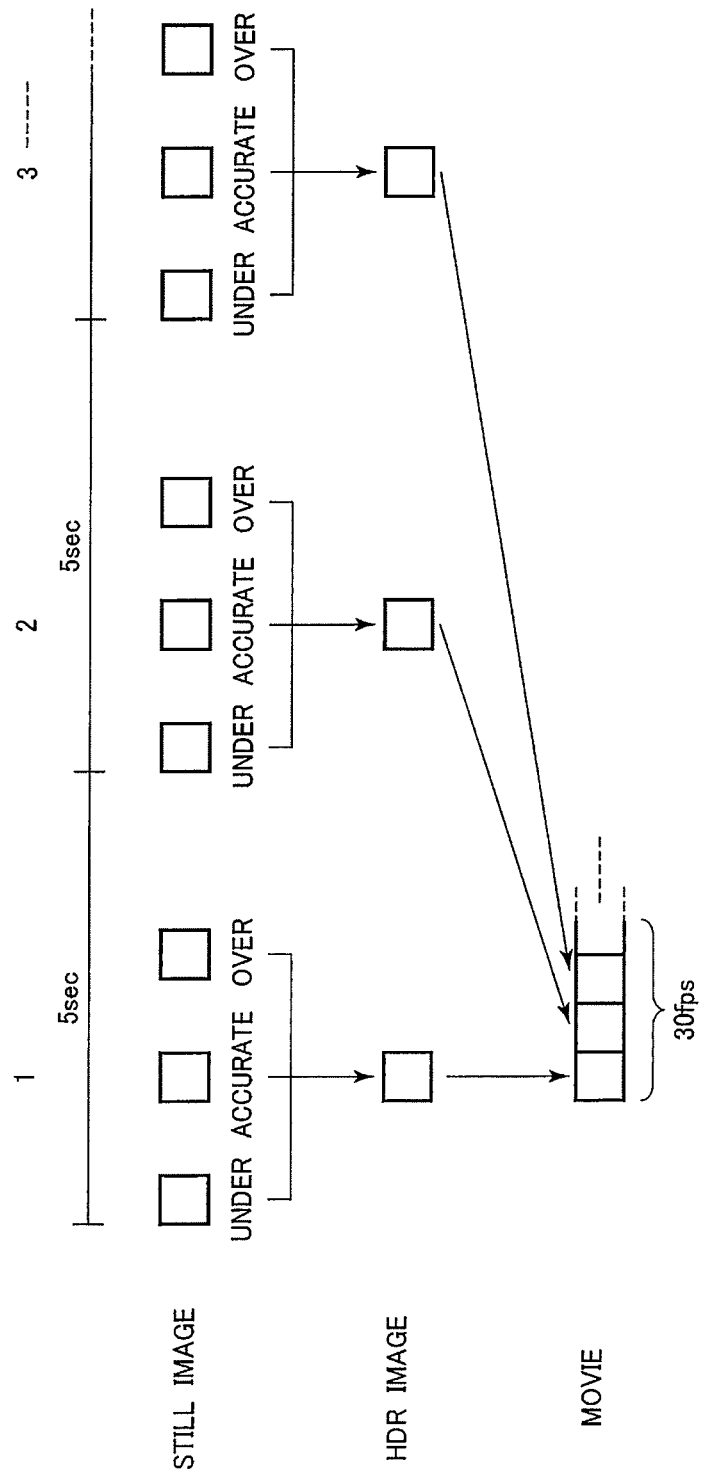
FIG. 2 shows the relationship between the still images and frames that constitute a movie.

The process from photographing a still image to creating an HDR image is described with reference to FIG. 2. The imaging sensor 102 periodically photographs three still images with exposures that differ from each other, e.g. under exposure, accurate exposure, and over exposure. After one still image is captured, the next still image is captured with a different exposure when the digital camera 100 is ready to photograph. This is repeated every five seconds. That is, the imaging sensor 102 photographs three still images every five seconds. The HDR connector 104 connects the three still images so as to create one HDR image. The frame integrator 109 integrates the multiple HDR images in chronological order, so that a movie is created. The movie has a frame rate of 30 fps (frames per second). That is, a movie of one minute includes 1800 HDR images.

The image processor 108 creates a false HDR image when the HDR connector 104 cannot create an HDR image. The image processor 108 manipulates a histogram, which is a luminance distribution of a still image with an accurate exposure, so as to create a false HDR image. In the case that a histogram of a still image biases to the left side of the histogram, that is, the lower luminance side, the image processor 108 shifts the whole histogram to the right side of the histogram, that is, the higher luminance side and extends it towards the lower luminance side. In other words, the image processor 108 increases the luminance values of the pixels that constitute a still image by a given amount, and multiplies the luminance values by a certain parameter that is less than or equal to one so as to decrease the luminance values. That is, the luminance is decreased with a linear function. Alternatively, in the case that a histogram of a still image biases to the right side of the histogram, that is, the higher luminance side, the image processor 108 shifts the whole histogram to the left side of the histogram, that is, the lower luminance side and extends it towards the higher luminance side. In other words, the image processor 108 decreases the luminance values of the pixels that constitute a still image by a given amount, and multiplies the luminance values by a certain parameter that is greater than or equal to one so as to increase the luminance values. That is, the luminance is increased with a linear function. In the case that a histogram of a still image does not bias to the left or right side of the histogram and concentrates instead on the center of the histogram, the image processor 108 extends the whole histogram to the higher and lower luminance side. In other words, the image processor 108 multiplies the luminance values that are larger than average by a certain parameter that is greater than or equal to one so as to increase these luminance values, and multiplies the luminance values that are less than average by a certain parameter that is less than or equal to one so as to decrease these luminance values. After these processes, the image processor 108 conditions the shape of the histogram to raise the contrast and saturation conditions of the image, so that the false HDR image is created. After that, the frame integrator 109 adds the false HDR image to the movie in the place of an HDR image, so that the movie is created.

Figure 3:
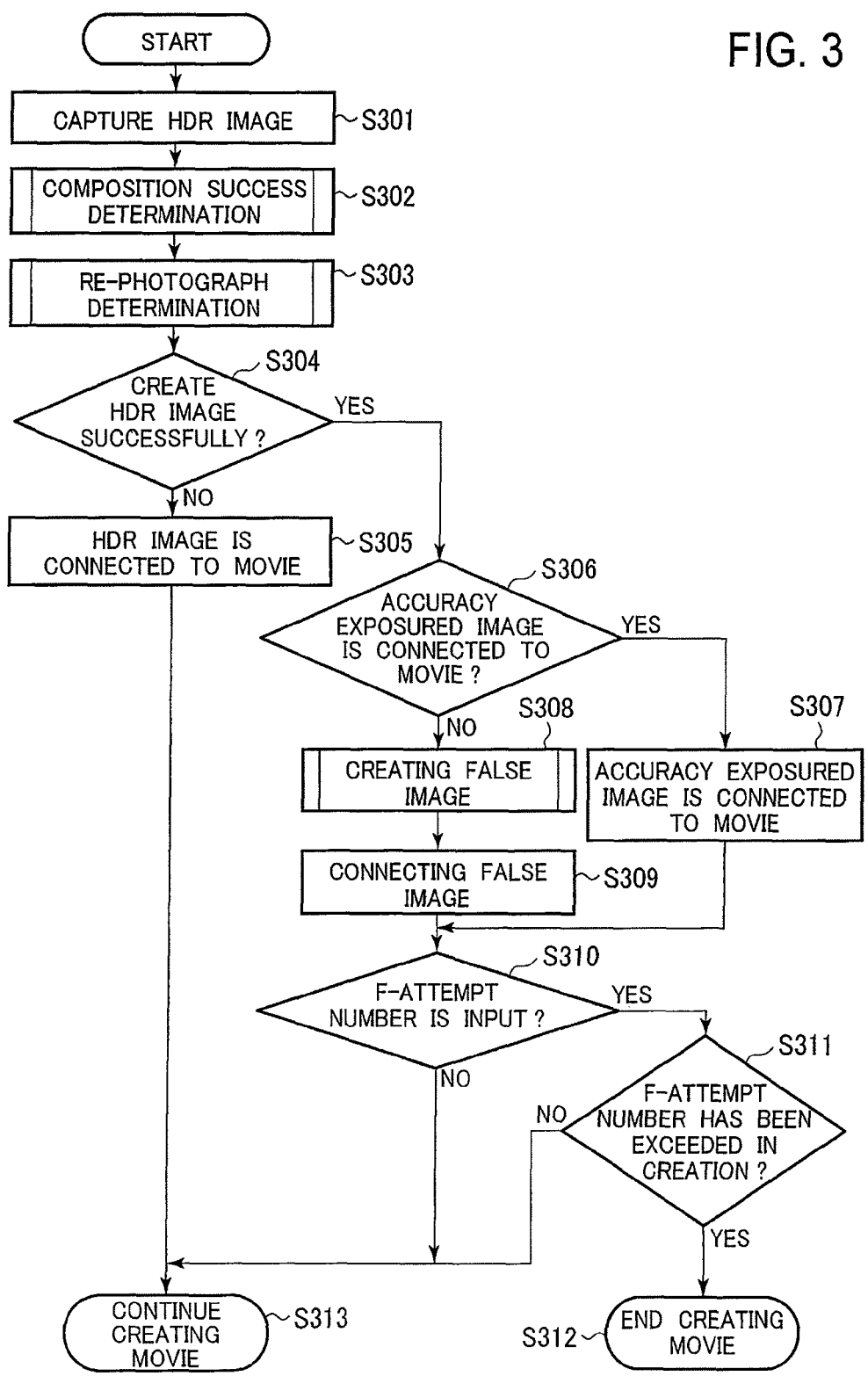
FIG. 3 is a flowchart showing a first movie-creating process of the present invention.

The first movie-creating process is described below with reference to FIG. 3. The first movie-creating process is executed when the digital camera 100 starts making a movie.

In Step S301, the imaging sensor 102 captures an underexposed still image, an accurately exposed still image, and an overexposed still image. Then, the HDR connector 104 combines the three still images so as to create one HDR image.

Next, in Step S302, the composition success determination process described hereinafter is executed. The composition success determination process determines whether or not an HDR image has been created successfully. An HDR image is created successfully when three still images are composed without any shift or displacement between the subject images that are included in the still images. A faulty HDR image occurs when three still images cannot be composed because of shift between the subject images that exceeds a certain length.

Next, in Step S303, the re-photograph determination process described hereinafter is executed. The re-photograph determination process determines whether or not to recapture a still image in the case that the HDR image does not succeed. A still image is photographed again and an HDR image is created under certain conditions.

Next, in Step S304, a determination is made as to whether or not the re-photograph determination process of Step S302 created an HDR image successfully. When it is determined to have succeeded, the process proceeds to Step S305, so that the HDR image created in the re-photograph determination process of Step S301 is integrated to a movie. When it is determined to have failed, the process proceeds to Step S306.

In Step S306, it is determined whether a still image with accurate exposure or an HDR image is integrated to a movie. A user can preliminarily determine whether or not a still image with accurate exposure is integrated to a movie, and inputs this command to the digital camera 100, accordingly. In the case that a still image with accurate exposure is integrated to a movie, the process proceeds to Step S307, otherwise, it proceeds to Step S308.

In Step S307, the still image with accurate exposure instead of an HDR image is integrated to the movie. Then, the process proceeds to Step S310.

Step S308 executes the first false image connecting process that is described hereinafter. The first false image connecting process creates a false HDR image by processing a still image with accurate exposure. The process proceeds to Step S309 after the false HDR image is created.

In Step S309, the false HDR image instead of an HDR image is integrated to the movie. Then, the process proceeds to Step S310.

In Step S310, it is determined whether or not an allowable number of attempts to create an HDR image is input to the digital camera by a user. The allowable number of attempts, or "F-Attempt" number, indicates how many times the creation of an HDR image can be attempted in succession. In the case that the F-Attempt number is input, the process proceeds to Step S311, otherwise, it proceeds to Step S313.

In Step S311, it is determined whether or not the F-Attempt number has been exceeded in the creation of an HDR image. In the case that the number is greater than or equal to the F-Attempt number, the process proceeds to Step S312, and the creation of a movie ends. In the case that the number is less than the F-Attempt number, the process proceeds to Step S313.

In Step S313, the creation of a movie continues.

Figure 4:
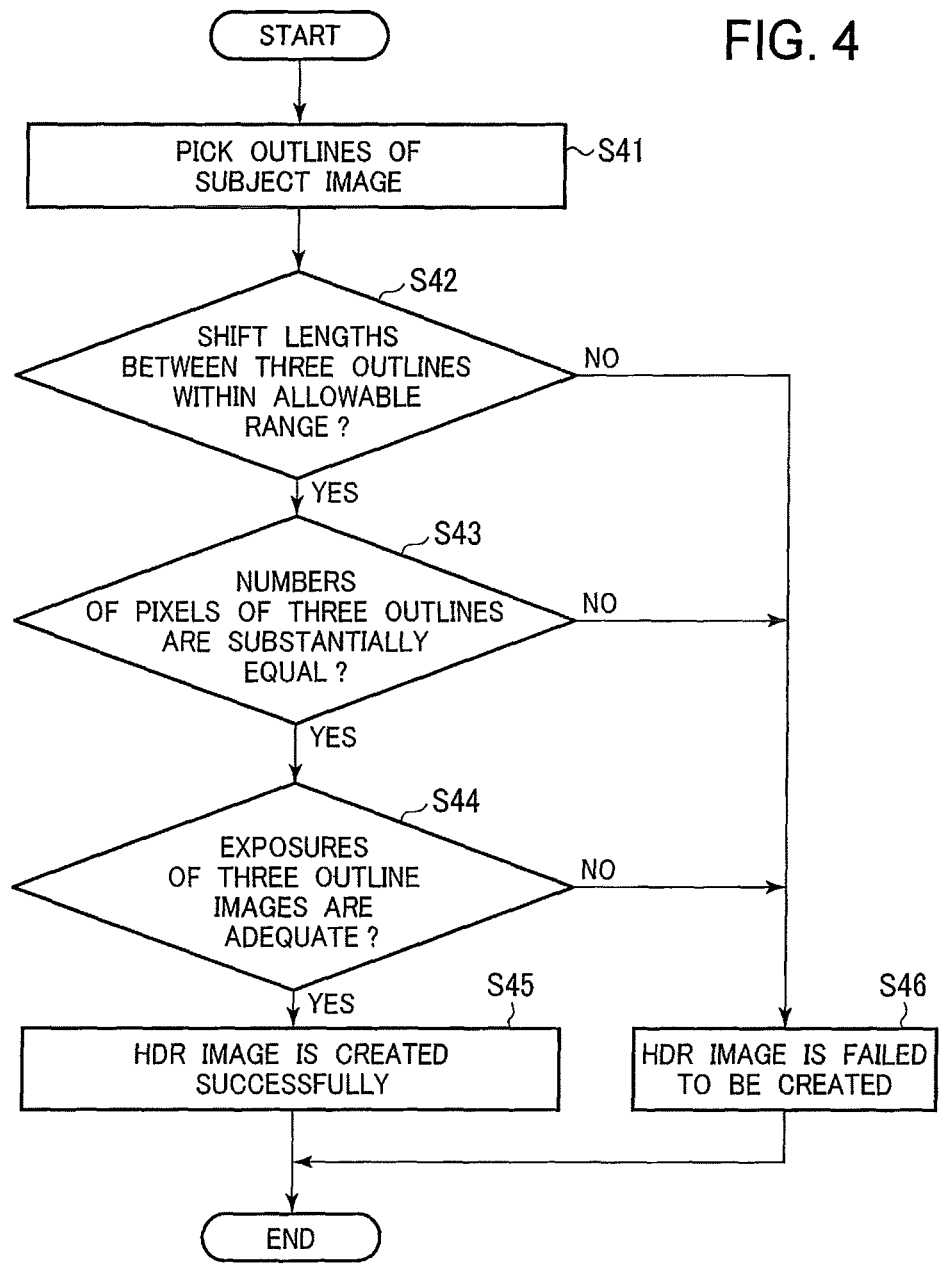
FIG. 4 is a flowchart showing a composition success determination process of the present invention.

The composition success determination process is described below with reference to FIG. 4. The composition success determination process is executed in Step S302 of the first movie-creating process by the HDR connector 104.

The process starts with Step S41. In Step S41, outlines of a subject image are picked from the over-, under- and accurately exposed still images, and outline images are created that include only outlines of the subject image from each still image. Therefore, three outline images are created.

Next, in Step S42, it is determined whether or not shift lengths between the outlines of the subject images in the three outline images are within an allowable range. In the case that the shift lengths are within an allowable range, the process proceeds to Step S43, otherwise, it proceeds to Step S46.

In Step S43, the three outline images are compared and it is determined whether or not the number of pixels that comprise the outlines of the subject images are substantially equal to each other. In the case that they are substantially equal to each other, the process proceeds to Step S44, otherwise, it proceeds to Step S46.

Next, in Step S44, it is determined whether or not the exposures of the three outline images are adequate. In this process, the three outline images are determined to be adequate in the case that a certain range of pixels includes a fraction of pixels with luminance values that are within a certain range. That is, an exposure is adequate in the case that a still image with accurate exposure is photographed with accurate exposure, a still image with under exposure is photographed with under exposure, and an overexposed still image is photographed with over exposure. In the case that exposure is adequate, the process proceeds to Step S45, otherwise, it proceeds to Step S46.

In Step S45, if it is determined that the HDR image is created successfully, a success flag is turned on. Otherwise, in Step S46, it is determined that the HDR image failed to be created and a failure flag is turned on. Then, the process ends.

That is, the HDR image is created in the case that a shift length between outlines of subject images in the three outline images is within an allowable range, the numbers of pixels that constitute the outline of the subject image are substantially equal to each other, and the exposures of the three outline images are adequate. If at least one condition is not met, the creation of the HDR image has failed.

Figure 5:
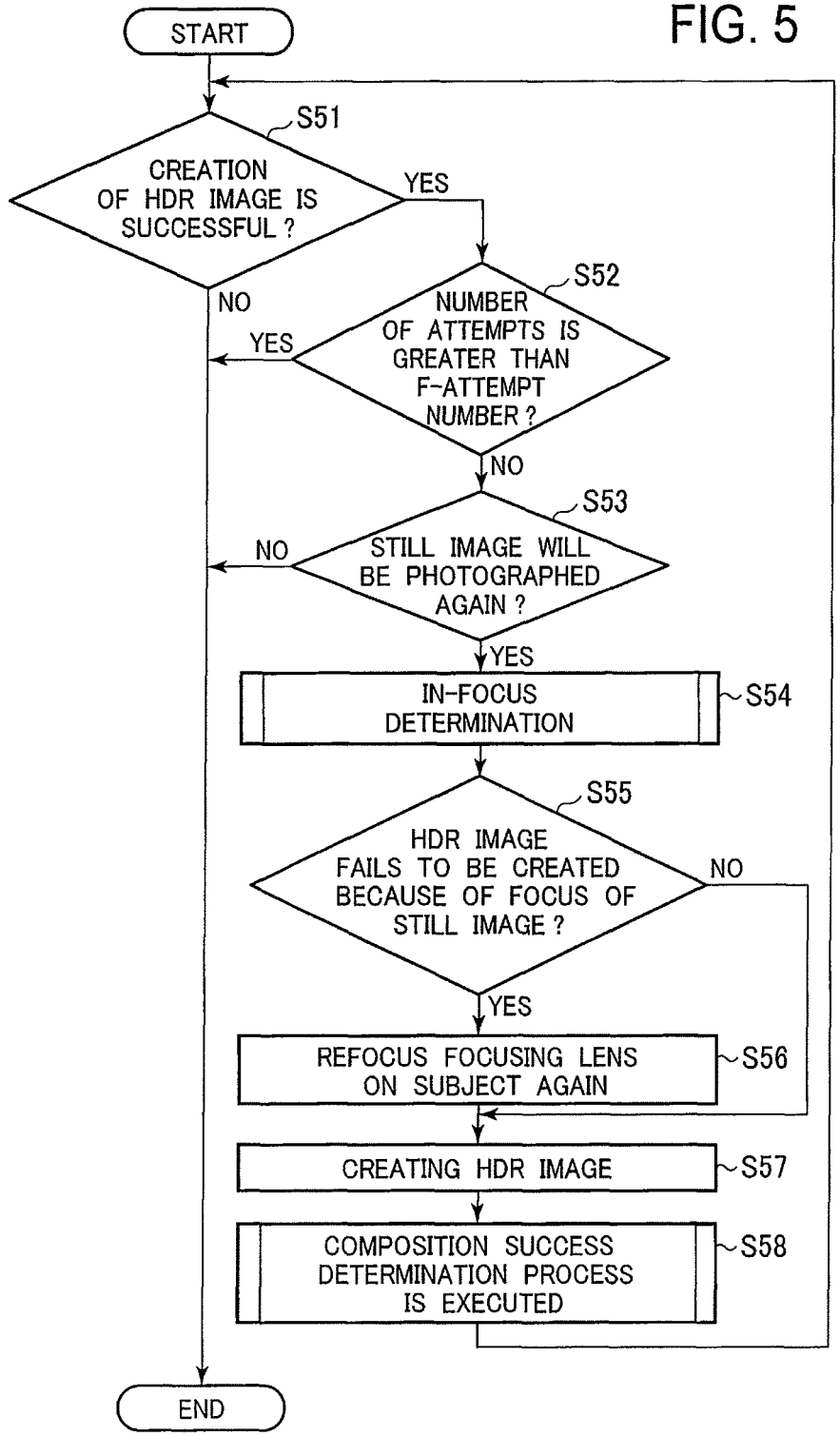
FIG. 5 is a flowchart showing a re-photograph determination process of the present invention.

The re-photograph determination process is described below with reference to FIG. 5. The re-photograph determination process is executed in Step S303 of the first movie-creating process by the re-photograph determiner 105.

First, in Step S51, it is determined whether or not the creation of the HDR image is successful. That is, it is determined whether the success flag or the failure flag is on. In the case that the success flag is on, the process proceeds to Step S52, and the process ends.

In Step S52, it is determined whether or not the number of attempts, in succession, to create an HDR image is greater than the F-Attempt number. That is, it is determined whether or not the attempt to create the HDR image has been repeated by an F-Attempt number of times. In the case that the number of attempts is greater than the F-Attempt number, the process ends, otherwise, the process proceeds to Step S53.

In Step S53, it is determined whether or not the still image will be photographed again. A user determines whether or not the still image will be photographed again, and inputs accordingly to the digital camera 100.

In Step S54, the in-focus determination process described hereinafter is executed for the still images with accurate, under-, and overexposures. The in-focus determination process determines whether or not the creation of the HDR image failed because of focus of the still image and determines that the subject was not in focus in the case that the contrast value of the still image is less than a threshold value. The outline of a subject image is blurred when the subject is not in focus, so that the number of pixels that constitute the outlines and the blur do not correspond to the similar aspects of other still images. Therefore, the in-focus determination process is executed so as to determine whether or not the creation of the HDR image failed because of focus of the still image, and refocuses the focusing lens 101 on the subject again after failure caused by focus of the still image.

In Step S55, the process proceeds to Step S56 when the HDR image fails to be created because of focus of the still image, otherwise the process proceeds to Step S57.

In Step S56, the AF controller 106 controls the focusing lens 101 so as to refocus the focusing lens 101 on the subject again. Then, the process proceeds to Step S57.

In Step S57, the process is the same as Step S31 of the first movie-creating process. That is, the imaging sensor 102 photographs three still images with exposures that differ from each other, and the HDR connector 104 combines the three still images to create an HDR image.

In Step S58, the composition success determination process is executed to determine whether or not the creation of the HDR image is successful. Then, the process proceeds to Step S51.

In the execution of the re-photograph determination process, repetitive failures to create the HDR image can be avoided by refocusing the focusing lens 101 on the subject following the first failed attempt to create the HDR image because the subject was not in focus in the first attempt.

Figure 6:
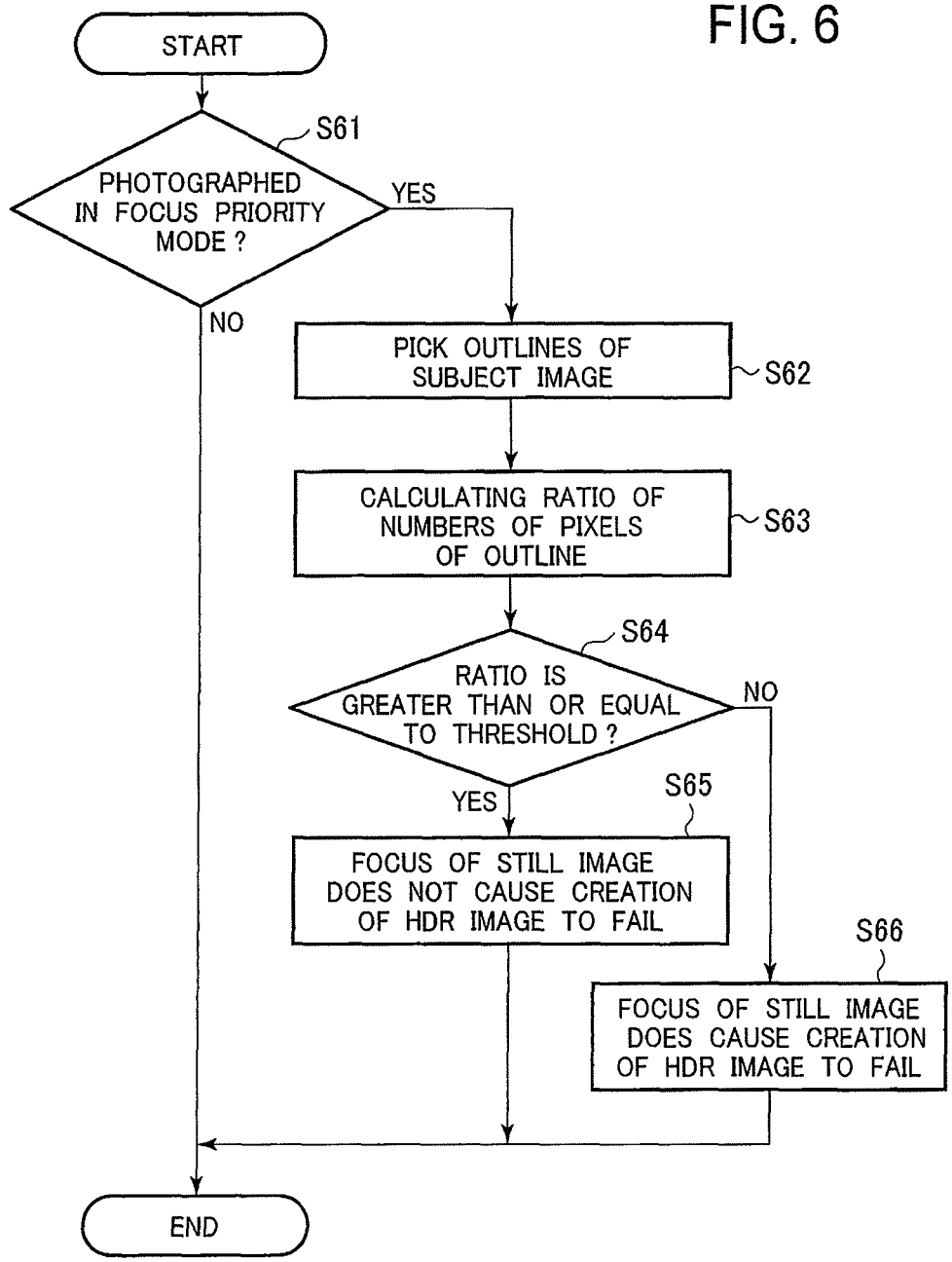
FIG. 6 is a flowchart showing an in-focus determination process of the present invention.

The in-focus determination process is described below with reference to FIG. 6. The in-focus determination process determines that the focusing lens 101 does not focus on a subject in the case that a contrast value of a still image is less than a threshold while the digital camera 100 is in the focus priority mode. The re-photograph determiner 105 executes the re-photograph determination process in Step S54.

In the first Step S61, it is determined whether or not the HDR connector 104 controls the digital camera in the focus priority mode. In the focus priority mode, the focusing lens 101 automatically focuses on a subject. The digital camera 100 in the focus priority mode does not photograph a subject until the photographic lens 101 is focused on the subject, whether or not a shutter release button 110 is depressed. The process then proceeds to Step S62 when the camera is in the focus priority mode. The process ends when the camera is not in the focus priority mode, because a user manually focuses on a subject.

In Step S62, outlines of a subject image are detected from the over-, under- and accurately exposed still images, and an outline image is created that includes only outlines of the subject images from each still image. Therefore, three outline images are created.

Step S63 calculates the ratio of the numbers of pixels that constitute the outline of the subject image to the number of pixels that constitute the outline of the whole still image.

Next, in Step S64, it is determined whether or not the ratio calculated in Step S63 is greater than or equal to a threshold. It is determined that the focusing lens 101 focuses on a subject when the number of pixels that constitute the outline of the subject image is greater than or equal to the number of pixels that constitute the outline of the whole still image. Therefore, the process proceeds to Step S65 in the case that the ratio calculated in Step S63 is greater than or equal to the threshold, otherwise it proceeds to Step S66.

In Step S65, it is determined that focus of the still image does not cause the creation of the HDR image to fail, and the process ends.

In Step S66, it is determined that focus of the still image does cause the creation of the HDR image to fail, and the process ends.

Figure 7:
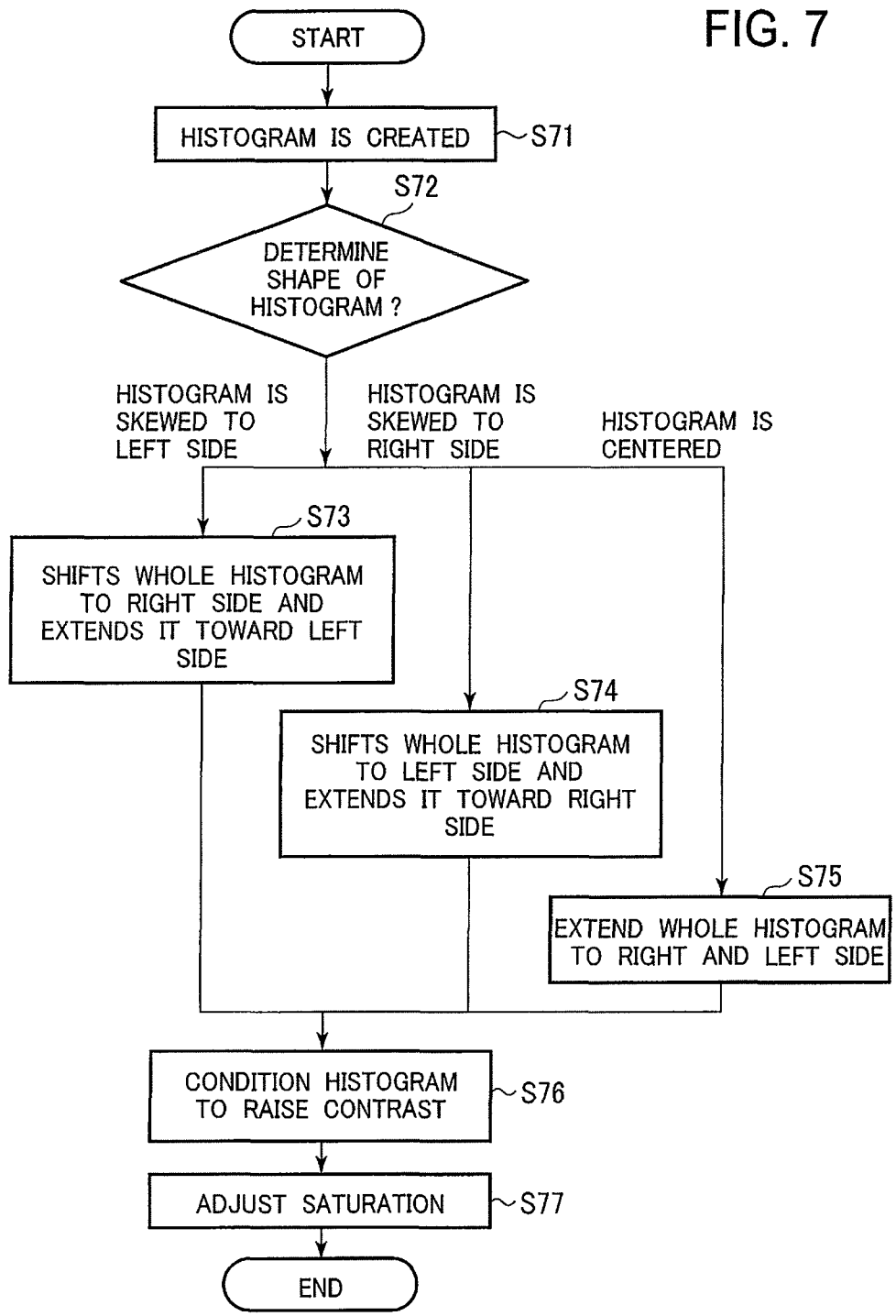
FIG. 7 is a flowchart showing a first false image connecting process of the present invention.

The first false image connecting process is described below with reference to FIG. 7. The image processor 108 executes the first false image connecting process in Step S30 of the first movie-creating process.

First, in Step S71, a histogram of a still image with accurate exposure is created.

Next, in Step S72, the shape of the histogram is determined. The process proceeds to Step S73 in the case that the histogram is skewed to the left side, that is, the lower luminance side. The process proceeds to Step S74 in the case that the histogram is skewed to the right side, that is, the higher luminance side. The process proceeds to Step S75 in the case that the histogram is not skewed to the left or right side, in other words the histogram is centered around its median value.

In Step S73, the image processor 108 shifts the whole histogram to the right side, which is the higher luminance side, and extends it toward the lower luminance side. In other words, the image processor 108 increases the luminance values of the pixels that constitute a still image by a given amount, and multiplies the luminance values by a certain parameter that is less than or equal to one so as to decrease the luminance values. That is, the luminance is decreased with a linear function.

In Step S74, the image processor 108 shifts the whole histogram to the left side, which is the lower luminance side, and extends it toward the higher luminance side. In other words, the image processor 108 decreases the luminance values of the pixels that constitute a still image by a given amount, and multiplies the luminance values by a certain parameter that is greater than or equal to one so as to increase the luminance values. That is, the luminance is increased with a linear function.

In Step S75, the whole histogram is extended in both the higher and lower luminance directions. In other words, the image processor 108 multiplies the luminance values that are greater than average by a certain parameter that is greater than or equal to one so as to increase these luminance values, and multiplies the luminance values that are less than average by a certain parameter that is less than or equal to one so as to decrease these luminance values.

According to Steps S73-S75, a biased histogram is distributed over the whole range of luminance, so that the brightness of a still image approaches the brightness of the HDR image. Therefore, an area in a still image with blocked up shadows becomes bright, and an area in a still image with blown-out highlights becomes dark, so that the brightness of a still image approaches the brightness of the HDR image.

In Step S76, the histogram is conditioned to raise the contrast of the still image.

In Step S77, the saturation of the still image is adjusted so that a false HDR image is created. Then, the process ends.

The conventional art cannot add an HDR image to a movie if the HDR image has not been created; therefore, a movie cannot be created because the conventional art does not consider a process that is executed only after the creation of the HDR image fails and the HDR image is thereby not created. However, according to the instant embodiment, the digital camera 100 can create a movie whether or not an HDR image has been created.

According to Steps S73-S75, the processed image has substantially the same level of brightness as the HDR image in the movie, so that the difference between the brightness of the processed image and the brightness of the HDR image in the movie is minimal. Therefore, discomfort of a viewer is avoided.

The creation of a movie ends when an HDR image fails to be created after a multiple number of successive attempts, so that a movie need not include an excessive number of still images that do not constitute an HDR image.

A user can manually input an F-Attempt number, so that a user can determine whether to continue or terminate the creation of a movie according to the photographing situation.

Figure 8:
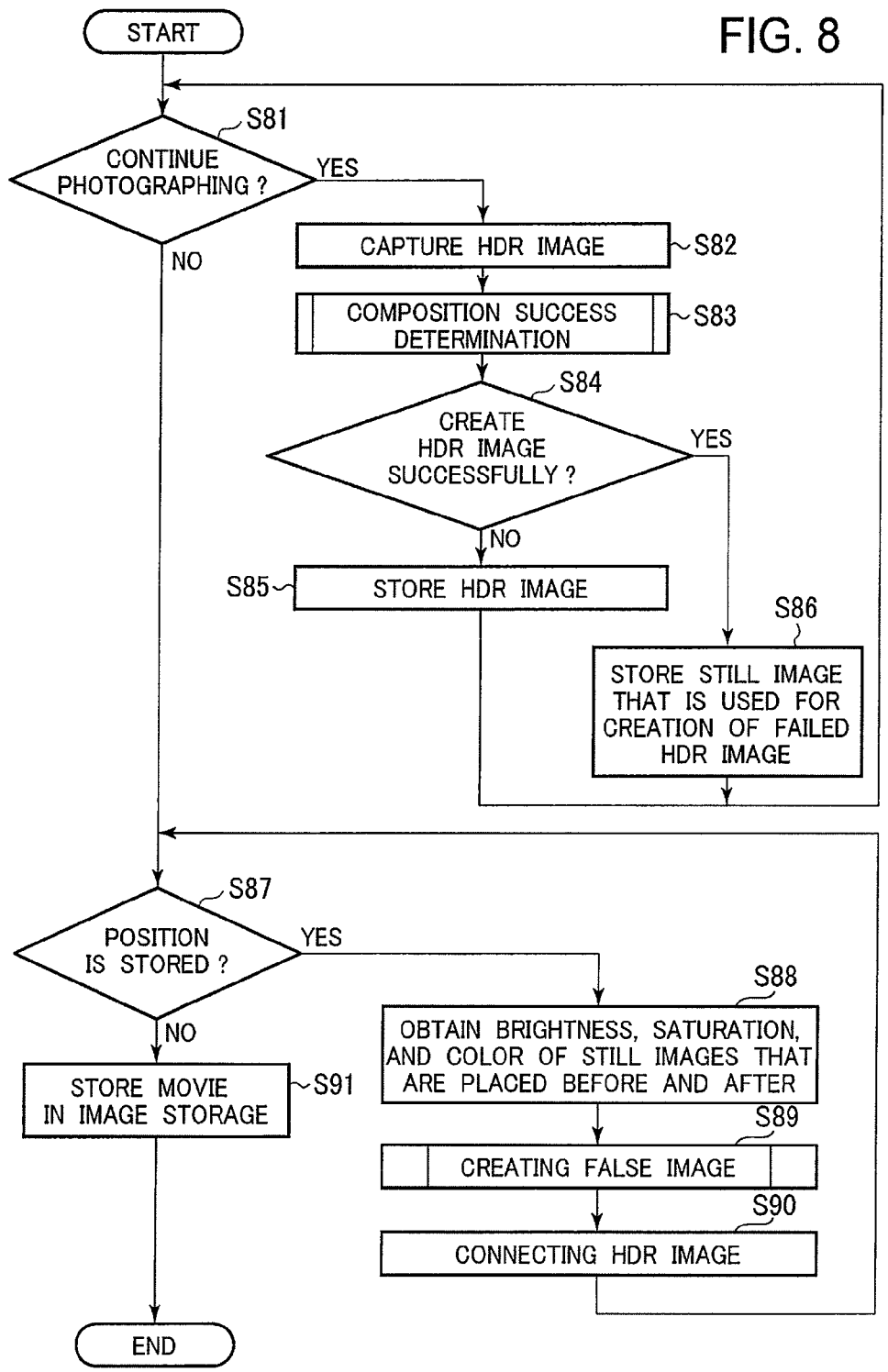
FIG. 8 is a flowchart showing a second movie-creating process of the present invention.

Another embodiment is described below with reference to FIG. 8. An imager according to the instant embodiment executes a second movie-creating process in place of the first movie-creating process. The second movie-creating process is described below with reference to FIG. 8. The second movie-creating process does not create a false HDR image based on whether or not an HDR image is created. Instead, it creates a false HDR image after all of the still images are captured, and then creates a movie. It is executed when the digital camera 100 starts photographing a still image.

First, in Step S81, it is determined whether or not the process of photographing a still image is to continue. The process proceeds to Step S87 where photographing is halted in the case that a certain period of time elapses or a user inputs a stop-photographing command to the digital camera 100. The process proceeds to Step S82 and photographing continues in the case that a certain period of time does not pass or a user does not input a stop-photographing command to the digital camera 100.

In Step S82, the imaging sensor 102 photographs an underexposed still image, an accurately exposure still image, and an overexposed still image. Then, the HDR connector 104 combines the three still images to create one HDR image.

In Step S83, the composition success determination process is executed, so that it is determined whether the attempt to create an HDR image succeeds in Step S82.

Next, in Step S84, it is determined whether or not the attempt to create an HDR image fails in Step S83. The process proceeds to Step S85 in the case that it succeeds. The process proceeds to Step S86, in the case that it fails.

In Step S85, the HDR image created in Step S82 is stored in the memory 103. Then, the process returns to Step S81.

In the Step S86, the memory 103 stores a still image that is used for the creation of a HDR image and a location in a movie in which the HDR image should be added. The location in a movie is a position of failure. Then, the process returns to Step S81. In Steps S81-S86, the false HDR image is not created whether or not an attempt to create the HDR image fails, instead still images are photographed over a certain period of time and stored in the memory 103. Then, the process proceeds next to Step S87 after photographing.

In Step S87, it is determined whether or not the position of failure is stored in the memory 103. The process proceeds to Step S88 in the case it is stored in the memory 103. Otherwise, the process proceeds to Step S91 in the case that it is not stored in the memory 103, and it is determined that a movie is to be created normally, and the movie is then stored in the image storage 110. Then, the process ends.

In Step S88, the brightness, saturation, and color of still images that are placed before and after the position of failure are obtained.

Next, in Step S89, the second false image connecting process is executed, so that a false HDR image is created. The false image connecting process approximates the brightness, saturation, and color of the still image in the position of failure to the brightness, saturation, and color of still images before and after the position of failure. Thereby, the difference in view between the still image in the position of failure and the still images immediately preceding and following the position of failure is decreased, so that discomfort of a viewer who watches the movie is decreased.

Next, in Step S90, the false HDR image is added to the position stored in Step S86. Then, the process returns to Step S87, and Steps S87-S90 are repeated so that a false HDR image is created for all of the position of failures stored in the memory 103, and each false HDR image is added to the movie.

By repeating Steps S87-S90, the false HDR images can be created for all of the position of failures, so that the creation of the movie can be completed with the false HDR images. After processing Steps S87-S90 for all of the positions of failure, the movie is stored in the image storage 110 in Step S91. Then, the process ends.

According to the embodiment, the same advantageous effects as the first embodiment are obtained. In addition, a movie is created after photographing a still image, so that the processing load of the digital camera 100 during photographing is decreased. The brightness, saturation, and color of a still image in the position of failure are similar to the brightness, saturation, and color of still images in the positions preceding and following the position of failure, so that discomfort of a viewer who watches the movie is decreased.

Note that, the photographing lens 101 may not be detachable, and may be fixed so as to be irremovable.

The imaging sensor 102 may not comprise the CCD, and may comprise a solid-state image sensor or the like.

The imaging sensor 102 may not photograph periodically.

The number of still images used for creating an HDR image may not be limited to three. Any number of multiple still images may be used.

A photographing interval between multiple still images may not be limited to five minutes. A frame rate of a movie may not be limited to 30 fps. These parameters may be selected based on photographing conditions.

Instead of the in-focus determination process, the HDR connector 104 may operate the digital camera 100 in the shutter release priority mode, and the re-photograph determiner may determines that a subject is not in focus when the focusing lens 101 does not focus on a subject at the moment of photography.

The process that manipulates a histogram for creating a false HDR image may not be limited to the process described hereinbefore. For example, the luminance need not be increased or decreased with a linear function, and may be increased or decreased with a nonlinear function instead.

In the first and second false image connecting processes, the false HDR image need not be created with a still image that has an accurate exposure.

The false HDR image may be created with a still image that has under or over exposure.

The F-Attempt number need not be determined by a user, and may be input as a predetermined value of the digital camera 100.

In Step S53 of the re-photograph determination process, a user need not input whether or not to photograph again, the digital camera 100 may ask a user whether or not to photograph again whenever the process executes Step S53, or the digital camera 100 may be preliminarily configured as to whether or not it should photograph again.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2012-074099 (filed on Mar. 28, 2012), which is expressly incorporated herein, by reference, in its entirety.

The invention claimed is:

1. An imager comprising:
   an imaging sensor that takes still images with exposures that differ from each other;
   a still image composer that composes still images so as to create a composite still image;
   a movie creator that integrates the composite still images so as to create a movie;
   said composer that creates a false composite still image and said movie creator that integrates the false composite still image in order to create a movie upon said still image composer being unable to create the composite still image; and
   a focus controller that focuses an optical element on a subject, and upon said still image composer being unable to create the composite still image and the optical element does not focus on a subject that is included in a still image, said focus controller focuses the optical element on a subject, said imaging sensor captures still images that have different respective exposures, said still image composer composes the still images that have different respective exposures so as to create a composite still image.

2. The imager according to claim 1, wherein the false composite still image is one of the still images that are included in the composite still image.

3. The imager according to claim 1, wherein said still image composer creates the false composite still image from a still image having the most accurate exposure among the still images that are included in the composite still image upon said composer being unable to create the composite still image.

4. The imager according to claim 1, wherein said still image composer creates the false composite still image with a still image that is created by adjusting the luminance distribution of a still image that is included in the composite still image upon said composer being unable to create the composite still image.

5. The imager according to claim 1, wherein said still image composer creates the false composite still image with a still image that is created by adjusting the luminance distribution of a still image having the most accurate exposure among the still images that are included in the composite still image upon said still image composer being unable to create the composite still image.

6. The imager according to claim 1, wherein said still image composer repeatedly attempts to create the composite still image until the composite still image fails to be created for a certain number of times.

7. The imager according to claim 1, wherein said still image composer stops attempting to create the composite still image upon the composite still image failing to be created in a certain number of attempts.

8. The imager according to claim 1, wherein said still image composer counts a number of still images in which photographed subject images do not correspond to each other, and determines that the composite still image has failed to be created upon the condition in which the number of still images is greater or equal to a certain number of still images.

9. The imager according to claim 1, wherein said still image composer determines that the composite still image cannot be created upon a subject image in a still image being out of focus.

10. The imager according to claim 1 further comprising a controller that operates the imager with multiple photographing modes, wherein the photographing modes have a shutter release priority mode in which the imager photographs a subject whether or not the optical element is focused on the subject upon a shutter release button being depressed, and wherein said still image composer determines that the optical element is not focused on a subject upon said focus controller not focusing the optical element on the subject at the moment of photography while the imager is in the shutter release priority mode.

11. The imager according to claim 1 further comprising a controller that operates the imager with multiple photographing, wherein the photographing mode has a focus priority mode in which the imager does not photograph a subject until the optical element is focused on the subject, whether or not a shutter release button is depressed, and wherein said still image composer determines that the optical element is not focused on a subject upon the contrast of the still image being less than a threshold value while the imager is in the focus priority mode.

* * * * *